Sept. 11, 1962   J. J. HARRINGTON ET AL   3,053,034
PEANUT HARVESTING MACHINE
Filed May 10, 1960   4 Sheets-Sheet 4

INVENTORS
Joseph J Harrington
Charles J Dunning
John D Mitchell
by Estabrook & Philpitt
ATTORNEYS United States Patent Office 3,053,034
Patented Sept. 11, 1962

3,053,034
PEANUT HARVESTING MACHINE
Joseph J. Harrington, Lewiston, Charles J. Dunning, Woodland, and John D. Mitchell, Woodville, N.C., assignors to Harrington Manufacturing Company, Lewiston, N.C., a corporation of North Carolina
Filed May 10, 1960, Ser. No. 28,140
20 Claims. (Cl. 56—130)

This invention generally relates to a novel and improved peanut harvester machine. More particularly, this invention pertains to a novel peanut harvester machine having a unique combination of means for both lifting peanut vines and attached peanuts off the ground together with closely associated means for recovering peanuts which become prematurely detached during or prior to the operation of picking up the peanut vines.

Background of Problem

Most peanut crops are presently harvested in two stages. In the first stage the peanut plants are uprooted from the ground with a plow-like device and allowed to lie upon the ground for a sufficient length of time so that partial drying of the vines and peanuts can take place. After the desired drying has taken place a peanut harvester machine moves over the peanut field in order to complete the second stage of harvesting. The peanut harvester machine picks the vines and attached peanuts up from the ground, passes the vines and attached peanuts to a harvesting section which separates the peanuts from the vines, after which the separated peanuts are deposited in a container and the stripped or threshed peanut vines are dropped back onto the ground. Under ideal harvesting conditions, no peanuts would become detached from the vines prior to the time that the vines and attached peanuts enter the harvester section. However, ideal harvesting conditions rarely prevail, and as a consequence peanuts become "prematurely" detached from the vines (i.e., before the vines enter the harvesting section). Premature detachment of the peanuts frequently occurs when the earth is damp or when a rain soaks the vines and peanuts after they are uprooted from the ground. Under such high moisture conditions the stem connecting the peanut to the peanut vine often becomes rotted or weakened to such an extent that some of the peanuts will become detached from the vines upon only a relatively slight movement or shaking of the peanut vine. Also, some peanuts will become prematurely detached from the vines when the vines have been dried for such a long period of time or under such conditions that the stem connecting the vine and the peanut becomes excessively brittle. When the stem connecting the peanut to the peanut vine becomes weakened either through rotting or because of excessive brittleness, even the most careful operation of a peanut harvesting machine will nevertheless result in the loss of a good many prematurely detached peanuts since the peanuts will be detached from the vines before the vines can be picked up and delivered to the harvesting section of the machine. Peanuts which become prematurely detached from the vines prior to the time that the peanut vines can be picked up and delivered to the harvesting section have heretofore generally been considered as a total loss insofar as most peanut farmers are concerned. The reason for this is that the above mentioned conditions which tend to favor the premature detachment of peanuts from peanut vines are the same conditions which frequently make it very difficult for the peanut farmer to recover the detached peanuts even if he should desire to do so. In other words, when the ground is quite damp and a peanut harvesting machine is used, if some of the peanuts become detached from the vines before the vines can be conveyed up onto the feed section of a peanut harvester, the peanuts fall back upon the damp earth where they may be pushed into the earth by the wheels which are located behind the pickup section of the peanut harvester. Also, it often happens that when the detached peanuts fall upon damp earth and are allowed to lie there for a length of time the damp earth frequently forms a mud-like bond with the peanut shells, making their recovery from the ground very difficult. If the loose peanuts are permitted to remain upon the ground for even a short period of time after the peanut harvester has picked up the peanut vines, there is the danger that (a) high winds will blow the peanuts into crevices and holes in the earth, (b) wind will cover the peanuts with leaves and other debris or (c) rain may damage the peanuts.

Heretofore no practical means has been presented for solving the above-mentioned problems. As a consequence, peanut farmers have often been forced to take considerable losses in their peanut crops (for example, amounting to as much as $100.00 per acre), simply because they were unable to pick up the peanuts which were prematurely detached prior to or during the course of the harvesting operation.

Prior Attempts To Solve Problem

In some cases, peanut farmers who find that there are a great number of loose peanuts lying on the ground after a harvesting operation attempt to pick up the loose peanuts by hand. This is of course very time consuming and expensive and totally impractical where farms of large acreage are involved.

In other cases, a few peanut farmers have tried to employ mechanical pickup means for picking up the peanuts which have fallen on the ground. At various times we have experimented with mechanical pickup means that have a plurality of finger-like elements which sweep close to the ground and force the peanuts into a collection means. However, we have found that such mechanical pickup means are quite unsatisfactory because such mechanical pickup means cannot efficiently handle both the loose peanuts and the threshed vines which are lying on the ground. The threshed vines not only clog up the mechanical pickup means but in addition the threshed vines constitute such a great percentage of the bulk of material picked up that considerable problems of conveying, containment and separation are presented. If there were no threshed vines lying on the ground, the mechanical pickup problems might be considerably lessened, but peanut farmers have been thoroughly educated as to the value of redepositing such threshed vines back on their fields in order to decrease the rate at which the mineral and plant food ingredient in the soil are depleted. Peanut farmers could, if they desired, collect and store their threshed vines at another location until the loose peanuts had been picked up, but this involves so much labor, time and expense that it is not worthwhile and as a practical matter peanut farmers simply will not do it.

Thus, although the problem has existed for many years, no successful solution has as yet been devised, as can best be proved by the fact that no manufacturer of peanut harvester combines has offered a machine for sale which will take care of prematurely detached peanuts.

Objects

It is, therefore, an object of this invention to provide a peanut harvesting machine which will permit the recovery of peanuts which become detached from the peanut vines prior to the time that the peanut vines can be conveyed into the harvesting section of the peanut harvester.

A further object of this invention is to provide a novel peanut harvesting machine which has a tandem arrangement for both processing peanut vines and recovering loose peanuts from the ground as the machine moves down a windrow of peanut vines.

A further object of this invention is to provide a novel peanut harvesting machine comprising a vine pickup and harvesting section and a loose peanut pickup section, said two sections coacting together in such a fashion that the vine pickup section serves the dual function of picking up the vines and at least temporarily clearing the way for more efficient operation of the loose peanut pickup section.

These and other objects are accomplished by the parts, elements, constructions, arrangements and combinations which comprise the present invention, the nature of which is set forth in the following general statement, preferred embodiments of which are set forth in the following description and illustrated in the accompanying drawings, and which are particularly and distinctly pointed out and set forth in the appended claims, forming a part hereof.

Before explaining the present invention in detail, it is to be understood that the invention is not limited in its application to the details of construction and arrangement of parts illustrated in the accompanying drawings, since the invention is capable of other embodiments and of being practiced or carried out in other ways. Also, it is to be understood that the phraseology and terminology employed herein is for the purpose of description and not of limitation.

The Invention Broadly

The novel peanut harvesting machine of the present invention can be generally characterized by the following combination of features:

(a) A drawbar section adapted to have its forward end operatively attached to a tractor (although this drawbar could obviously be omitted if one chose to build the motive power into the harvesting machine rather than to have a tractor pull the machine);

(b) A mainframe section connected to and disposed rearwardly of said drawbar section for supporting the various sections of said peanut harvester;

(c) Wheels attached to said mainframe section which serve to elevate said mainframe section the desired distance above the ground and facilitate movement thereof along the ground;

(d) A combination vine pickup and vine conveyor arrangement attached to the forward portion of said mainframe and which has a feed surface which is adapted to move vines and attached peanuts in an upward and rearward direction;

(e) An elongated rotating cylindrical brush member having its axis disposed horizontally above the surface of the ground in a line transverse to the direction of travel;

(f) Said brush member being located rearwardly of the lower front end of said vine pickup and vine conveying surface;

(g) Said brush member being located at a level lower than the upper back end of said inclined combined vine pickup and vine conveying surface;

(h) Means for adjusting the lower peripheral sweep of said elongated brush member to any desired distance above the ground;

(i) Means for rotating said brush member about its axis;

(j) An inclined ramp means transversely disposed closely adjacent to at least a portion of the periphery of said brush member;

(k) The lower transverse edge of said inclined ramp means being disposed substantially at ground level;

(m) The upper transverse edge of said inclined ramp means being disposed closely adjacent to and in substantially parallel relationship with a transverse peanut conveyer means;

(n) Said peanut conveyer means being mounted on said mainframe section; and (o) Collection means located adjacent the end of said peanut conveyer means which is adapted for the collection of peanuts deposited upon said conveyer means by the combined action of the brush member and the inclined ramp means.

The Invention Specifically

Peanut harvesters which utilize an inclined vine pickup and vine conveyer arrangement have been on the market for a number of years (see for example The Harrington Manufacturing Co. four-page brochure entitled "The Roanoke Peanut Combine"). Since such inclined feed conveyer arrangements are well known and since the particular manner of their construction forms no part of the novely of this invention, no detailed drawings have been presented to such feed conveyer arrangements in their entirety. It is believed that the general operation and overall functioning of such a feed conveyer can be adequately illustrated and understood by referring to FIGURE 1.

Figure 1:
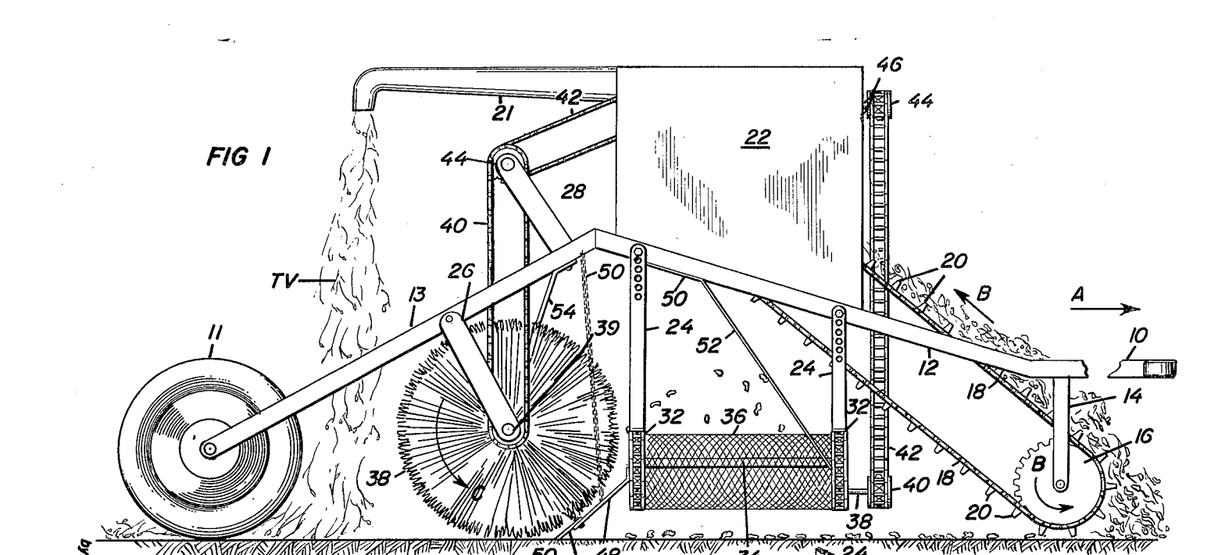
FIGURE 1 is a side elevation of a first embodiment of a peanut harvester in accordance with this invention.
Figure 2:
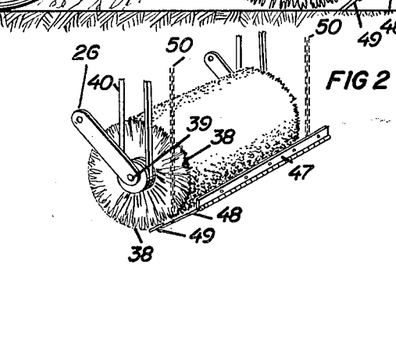
FIGURE 2 is a partial perspective view of a portion of the novel brush and pickup means shown in FIGURE 1.
Figure 3:
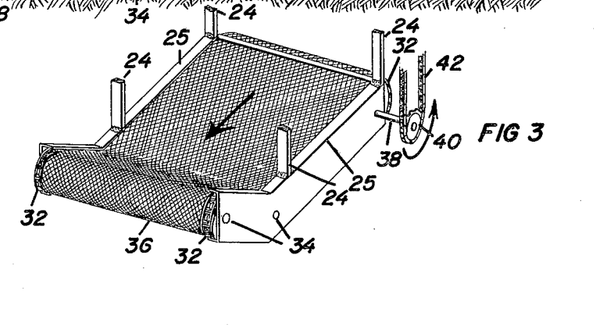
FIGURE 3 is a partial perspective view from the front end above of the conveyer arrangement shown in FIGURE 1.

FIGURE 1 illustrates the essential elements of a peanut harvesting machine in accordance with this invention. The basic elements around which this harvesting machine is built include the drawbar section 10, the rear wheels 11 and the supporting mainframe sections 12 and 13. The drawbar section 10 is adapted to be attached to the rear end of a tractor (not shown) that is to be pulled in the direction indicated by arrow A. Depending downwardly from the vicinity of the mainframe section 12 or from the drawbar section 10 is a bracket support 14 which is in turn adapted to rotatably support a lower conveyer belt sprocket 16. A vine feed and conveyer belt 18 is adapted to move around the lower feed conveyer sprocket 16 in the direction indicated by arrow B. The feed conveyer belt 18 is provided with a plurality of rows of pickup fingers 20. The pickup fingers 20 of the feed conveyer belt 18 also move in the direction indicated by the arrow B. At the point where the pickup fingers 20 most closely approach the ground (i.e., from a fraction of an inch to several inches from the ground), the pickup fingers move around the lower conveyor sprocket 16 and in so doing sweep in a simultaneous forward and upward direction. By this sweeping action, peanut vines which are lying in the path of the peanut harvester are swept up off the ground and carried upwardly and rearwardly. As the peanut vines and attached peanuts are moved in an upward and rearward direction on conveyer belt 18 they enter the housing 22 containing the harvesting and drive mechanisms. An outlet chute 21 is provided for discharging the threshed peanut vines "TV" rearwardly of brush member 38. Since the details of the harvesting and drive mechanisms located within housing 22 form no part of the novelty of the present invention, detailed drawings thereof have not been provided and instead this unit has been simply represented by the numeral 22. Likewise, since the specific means utilized for driving the feed conveyer belt 18 forms no part of the novelty of this invention, the details thereof are not shown and those skilled in the art will realize that any suitable driving arrangement (e.g. located within housing 22) could be employed. Those skilled in this art are aware that such feed conveyers and feed conveyer belts can either be driven independently by a separate motor means or they may be driven by a power takeoff arrangement from the tractor which is used to pull the peanut harvester machine.

With further reference to FIGURE 1, it will be noted that the supporting main frame section 12 is provided with a plurality of downwardly depending bracket supporting means 24, which are fastened in any desired manner to the mainframe 12. The lower extremities of bracket supporting means 24 are joined to two channel sections 25. Channel sections 25 in turn are adapted to support a plurality of sprockets 32 and sprocket shafts 34 and 38. Sprockets 32 and sprocket shafts 34 carry chain belt conveyer 36, the lateral edges of chain belt conveyer 36 being provided with spaced openings or other means for engaging the toothed surfaces of the sprocket wheels. One or more of the sprockets 32 can be connected to a power input shaft arrangement 38 which can then be operatively conneced to a lower drive sprocket 40, a sprocket chain 42, an upper drive sprocket 44 and a power takeoff shaft 46 from the housing 22, which houses the main drive mechanisms. The main drive mechanisms contained within the housing 22 are not shown in detail since they form no part of the novelty of this invention and would be obvious to anyone skilled in the art. The main drive mechanism could either be driven by a tractor power takeoff or by an independent motor.

The conveyer 36 which can be either of the belt type or chain type preferably extends for substantially the full width of the harvester and is adapted to move in a direction which is generally perpendicular to the direction of travel of the peanut harvester machine. Chain type conveyers perform the dual function of sifting and conveying. Although not absolutely necessary, the discharge end of the chain belt conveyer 36 is preferably elevated somewhat at one end so that the material contained on the chain belt conveyer 36 can be conducted to a suitable container or elevating mechanism. The peanuts thus deposited in the container or in the elevating mechanism can thereafter either be removed from the machine or passed through one or more harvesting sections of the machine.

Also mounted on the mainframe section 13 is a supporting bracket means 26. Bracket means 26 is adapted to rotatably support an elongated brush member 38. Brush member 38 is preferably of a generally cylindrical shape and has its axis approximately horizontally disposed above the ground along a line generally perpendicular to the line of travel of the peanut harvester. The brush member 38 is driven in the direction indicated by arrow C by any suitable driving means, as for instance the belt driving arrangement 40, 42 and 44. The drive belt 40 may be suitably connected at its lower end to a drive pulley or drive sprocket mounted on the shaft 39, of the brush member 38 and may be connected at its upper end to a suitable pulley or sprocket drive means 44, which is supported in turn by bracket means 28. One end of belt drive 42 may pass around drive pulley 44 and the other end may pass around a main drive pulley (not shown) located within the housing 22.

It will be noted that the brush member 38 is located directly behind the chain belt conveyor 36. Between the brush member 38 and the chain belt conveyer 36 there is preferably disposed an inclined ramp means 48. One end of inclined ramp means 48, and in particular the upper end, is preferably hingedly connected to a portion of bracket means 24 as for instance by a piano hinge 47. The distance of the lower end of inclined ramp means 48 above the ground may be regulated by an adjustable chain 50, the upper end of which is attached to a portion of the mainframe 12—13. The distance of the lower end of inclined ramp means 48 above the ground may also be regulated by providing said lower end of the inclined ramp with a slotted adjustment means 49, which in effect permits the length (from the ground to the conveyor surface) of the inclined ramp to be changed and to be adjusted to compensate for wear. A preferred length is 12 inches.

The lower longitudinal edge of the inclined ramp 48 is preferably maintained on or very close to the ground and it has been found that the fallen peanuts which are lying on the ground will easily pass thereunder before being brushed up onto the upper inclined surface of ramp 48 by the forward sweeping action of brush member 38. The ramp surface 48 is preferably provided with a plurality of perforations of a size slightly smaller than a peanut, such perforations serving the function of assisting in the separation of dirt, stones, twigs, and other debris from the peanuts which are swept up by brush member 38.

Operation

In operation, the peanut harvesting machine shown in FIGURE 1 is pulled in the forward direction indicated by arrow A. As the harvesting machine is drawn in the direction indicated by arrow A, the vine feed conveyer section is made operative and the pickup fingers 20 sweep closely adjacent to the ground as they turn in the direction indicated by arrow B and the windrowed peanut vines with attached peanuts lying upon the ground in their path are picked up and conveyed upwardly along the upper surface of conveyer belt 18 and then into the housing 22 wherein the peanuts are seperated from the peanut vines by the harvesting mechanisms contained therein. However, the feed conveyer belt 18 and pickup fingers 20 are not spaced closely enough together to pick up loose peanuts which have become prematurely detached from their vines and which are resting on the ground and, accordingly, such prematurely detached peanuts will pass rearwardly under the vine feed conveyer section. As the peanut harvesting machine progresses in a forward direction, the brush member 38 is likewise operatively functioning and moving in the direction indicated by arrow C. The lower peripheral sweep of the brush member 38 is either directly on the surface of the ground or so close thereto that any loose peanuts lying upon the ground will be swept in a forward and upward direction under the combined influence of the centrifugal force imparted by the somewhat flexible radial elements of the brush member 38 and the inclined ramp means 48. If the brush member 38 is arranged so that its individual brush elements will be slightly bent at the lowest point of their peripheral sweep due to contact with the ground, the overall effect is that each brush element will "flick" any material lying immediately ahead of it during the upward sweep of the brush element. Considerable force can be generated by this "flicking" operation.

The loose peanuts lying upon the ground are in effect brushed or propelled in a forward and upward direction until they fall upon the chain belt conveyer 36. Since in some instances the loose peanuts may be propelled in a forward direction up the inclined ramp 48 with rather great force, it is desirable to provide suitable deflection shields above and around the area of the chain belt conveyer 36 to insure that the loose peanuts which are brushed up off the ground by the brush means 38 will eventually fall upon the chain belt conveyor 36 and will not be thrown back out upon the ground. A sheet metal deflection shield such as is shown at 50 and 52 is usually sufficient for this purpose.

In addition, since in some instances peanuts may become lodge between adjacent bristles of brush member 38 or between adjacent groups of bristles, it is often desirable to provide a suitable doffing means 54 adjacent to the top peripheral sweep of the brush member 38 so as to cause any peanuts which are carried upwardly this far to be returned to the conveyor 36.

Figure 4:
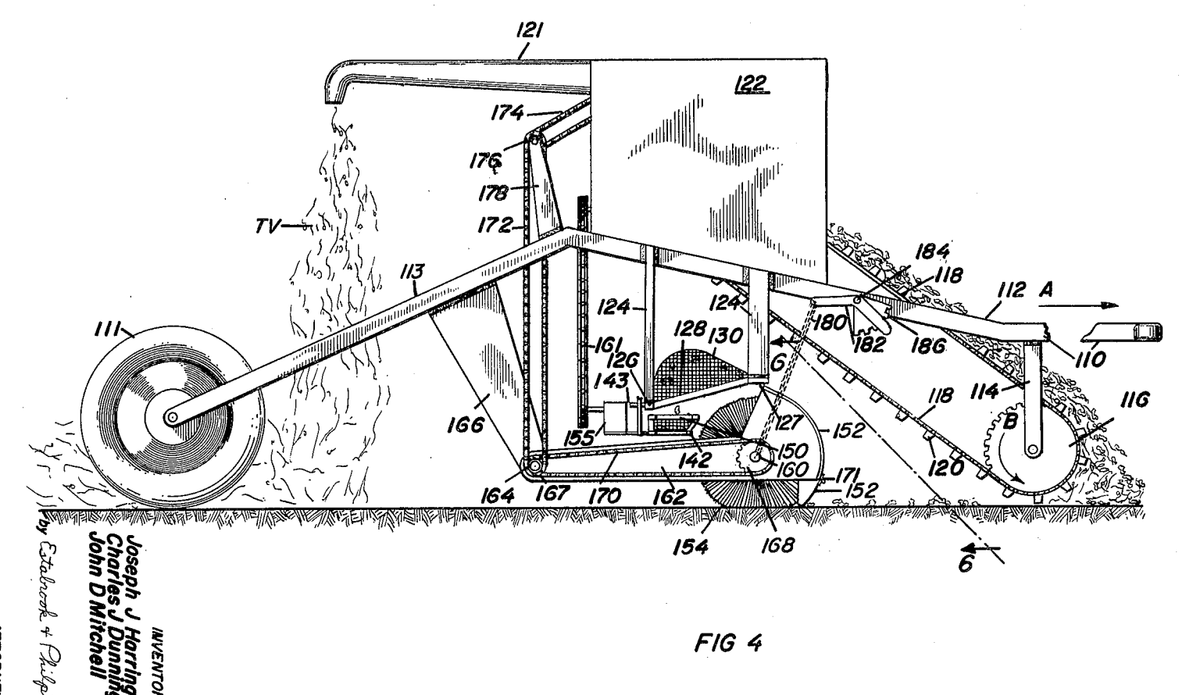
FIGURE 4 is a side elevation view of a second embodiment of a peanut harvester in accordance with this invention.

FIGURE 4 illustrates a preferred embodiment of a peanut harvesting machine in accordance with this invention. FIGURE 4 is similar to FIGURE 1 in that the basic elements around which the harvesting machine is built include a drawbar section 110, rear wheels 111 and the supporting main frame sections 112 and 113. The drawbar section 110 is adapted to be attached to the rear end of a tractor (not shown) that is to be pulled in the direction indicated by arrow A. Depending downwardly from the vicinity of the main frame section 112 or from the drawbar section 110 is a support bracket 114 which in turn is adapted to rotatably support a lower conveyor belt sprocket 116. A vine feed and vine conveyor belt 118 is adapted to move around the lower feed conveyor sprocket 116 in the direction indicated by the arrow B. The feed conveyor belt 118 is provided with a plurality of rows of pickup fingers 120. The pickup fingers 120 of the feed conveyor belt 118 also move in the direction indicated by the arrow B. At the point where the pickup fingers 120 most closely approach the ground (i.e., from a fraction of an inch to several inches from the ground), the pickup fingers move around the lower conveyor sprocket 16 and in so doing sweep in a simultaneous forward and upward direction and by this sweeping action, peanut vines which are lying in the path of the peanut harvester are swept up off the ground and carried upwardly and rearwardly.

As the peanut vines and attached peanuts are moved in an upward and rearward direction on conveyer belt 118, they enter the housing 122 containing the harvesting and drive mechanism. An outlet chute 121 is provided for discharging the threshed peanut vines "TV" rearwardly of the havesting machine. As has been explained earlier, since the details of the harvesting and drive mechanism located within housing 122 form no part of the novelty of the present invention, detailed drawings thereof have not been provided and instead this unit is simply represented by the numeral 122. Likewise, since the specific means utilized for driving the feed conveyer belt 118 form no part of the novelty of this invention, details thereof are not shown and those skilled in the art will realize that any suitable driving arrangement (e.g. located within housing 122) could be employed. Those skilled in this art are aware that such feed conveyers and feed conveyer belts can either be driven independently by a separate motor means, or they may be driven by a power takeoff arrangement from the tractor which is used to pull the peanut harvester machine.

With further reference to FIGURE 4, it will be noted that the supporting main frame section 112 is provided with two downwardly depending bracket supporting means 124, which are fastened in any desired manner to the main frame 112. The lower extremities of bracket supporting means 124 are joined to two transversely disposed support members 126 and 127. Transverse support members 126 and 127 are in turn joined together by inclined bracing members 128. Within the framework provided by members 124, 126 and 127 and 128, there is fitted a curved or cup-shaped screen member 130. The screen member 130 comprises an upper curved or arcuate portion as well as two end portions. The mesh of the screen is not critical except that it should be small enough to prevent peanuts from falling therethrough and large enough to permit sand and other small debris to pass therethrough.

Figure 5:
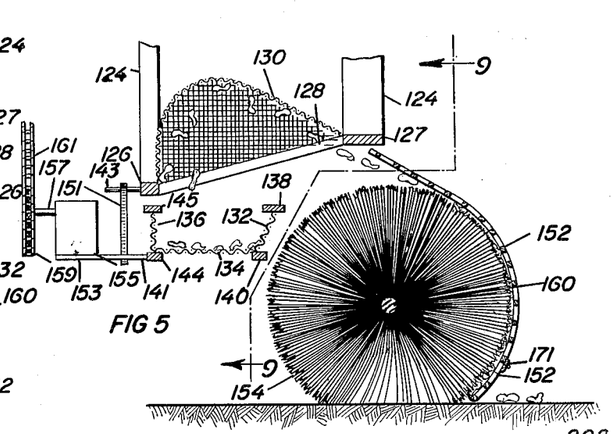
FIGURE 5 is a partial sectional view along 5—5 of FIGURE 6.

As is perhaps best shown in FIGURE 5, a second screen arrangement is provided beneath the screen 130. This second screen arrangement preferably comprises front screen panel 132, bottom panel 134 and back panel 136. Screen panels 132, 134 and 136 are supported by a suitable arrangement of rigid supporting members 138, 140, 144 and 145. The outer ends of screen members 132, 134 and 136 are further braced by end bracing members 142, 146, 148 and 150 as is seen more clearly in FIGURE 7 (which is a view along 7—7 of FIGURE 6).

Figure 8:
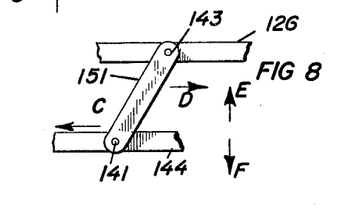
FIGURE 8 is a partial view of the back of the support arrangement shown in FIGURE 5.

FIGURE 5 in conjunction with FIGURE 8 further shows the manner in which the two screen arrangements 130 and 136 are operatively connected together. Two pivot pins 141 and 143 are located in rigid supporting members 144 and 126 respectively. Hanger bars 151 have holes adjacent both ends are loosely fitted over pins 141 and 143, thus suitably suspending the lower screen arrangement. Also joined to rigid supporting member 144 is a platform 153, which in turn contains a housing 155, shaft 157 and eccentric member 159. Since member 159 is eccentric, when it is driven by belt 161 from any suitable source the net result will be (since pin 143 and member 126 remain fixed) that the pin 141 and the member 144 will cyclically move in the direction indicated by arrows C, E, D and F. If the screen 134 is inclined slightly with respect to the ground, the net result will be that peanuts deposited on the screen will be violently shaken or vibrated and will move toward the end which is closest to the ground. The end of the screen 134 to which the peanuts move (the right end in FIGURE 9) should not have an end screen panel, thus allowing the peanuts to be discharged to either a suitable container or a suitable conveying means.

Figure 6:
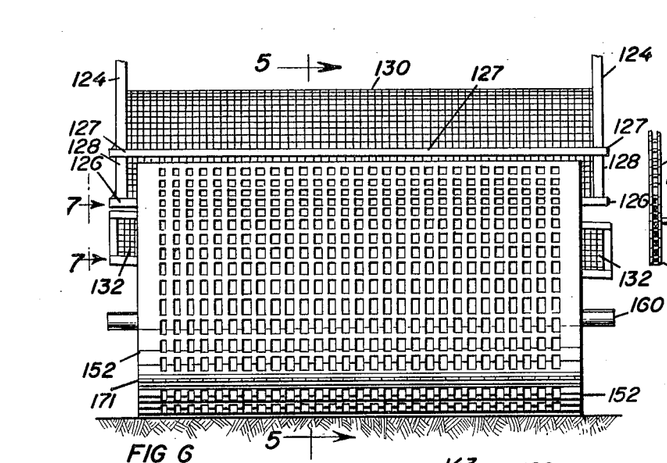
FIGURE 6 is a view along 6—6 of FIGURE 4.
Figure 7:
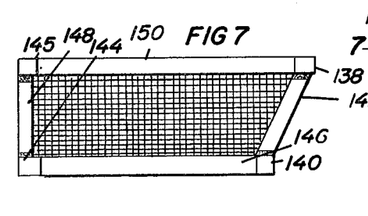
FIGURE 7 is a view along 7—7 of FIGURE 9.

FIGURE 6 is a view along the line 6—6 of FIGURE 4 showing the relationship of the screen 130 to the inclined ramp means 152 that is disposed closely adjacent to the brush member 154. FIGURE 5 is a view along the line 5—5 of FIGURE 6 also showing this relationship.

The brush member 154 is supported on an axle 160, the ends of said axle being supported by two bracket support members 162 which are in turn adapted to pivot about fixed shaft 164 located at the lower end of bracket 166. Shaft 164 contains a drive pulley 167, which, in conjunction with the drive pulley 168, belts 170, 172 and 174 serves to cause brush member 154 to rotate in a counterclockwise direction (in FIGURE 4). Belt 174 drives pulley 176 and is in turn driven by means (not shown) located within section 122. Pulley 176 is supported by bracket 178 located on mainframe section 113.

Axle 160 (or bracket 162) may be attached to a portion of the mainframe 112 in such a manner that the distance of axle 160 above the ground can be varied. One such elevating means is shown in FIGURE 4 as consisting of a chain 180 which has its lower end attached to axle 160 and its upper end attached to one arm of pivotable lever 182. Lever 182 is pivoted about pin 184 and is maintained in any desired position by engagement with notched slide means 186 (of well known design).

The full weight of bracket 162 and brush member 154 need not be supported by chain 180, and instead a portion of such weight can be taken up by resiliently connecting the bracket 162 (or the axle 160) to a portion of the mainframe (e.g., as by spring 190).

The forward ends of bracket support means 162 can suitably serve as a means for attaching the inclined ramp means 152, as by welding. In a preferred embodiment of this invention, the inclined ramp means is hinged as at 171 so that the portion of the inclined ramp means which is to ride on or closely adjacent to the ground can have some degree of freedom of movement and protection in the event that bumps, rocks or other uneven contours are encountered. In practice it has been found preferable to permit the lower hinged portion of inclined ramp means 152 to swing free so that its lower edge in effect scrapes along the surface of the ground. The front surface of ramp means 152 is preferably perforated with a plurality of openings which are small enough to prevent peanuts from passing therethrough and yet large enough to allow sand, dirt, small pebbles and other debris to pass therethrough. Inclined ramp means 152 therefore preferably (but not necessarily) can function as a preliminary cleaner or sifter for the peanuts which are picked up off the ground.

Figure 9:
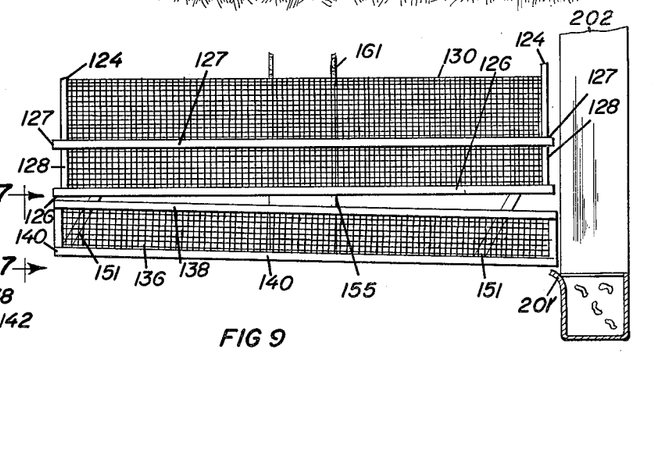
FIGURE 9 is a view along 9—9 of FIGURE 5.
Figure 10:
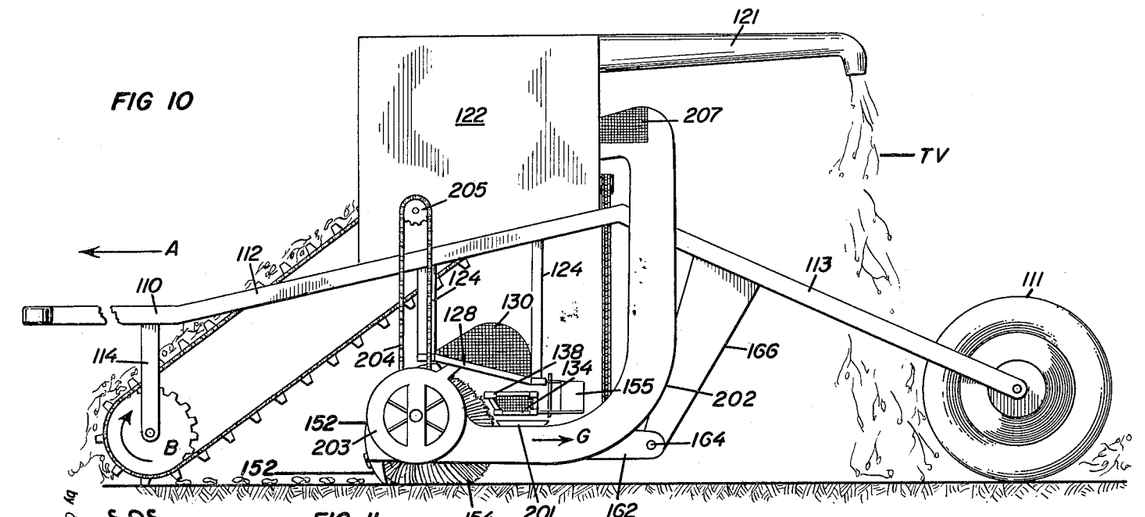
FIGURE 10 is a side elevation view from the opposite side of the machine shown in FIGURE 4.

FIGURE 10 shows a fragmentary view of the opposite side of the peanut harvester to that which is shown in FIGURE 4. The primary purpose of this view (in conjunction with FIGURE 9) is to show how the peanuts which are discharged from one end of the lower screen conveying means may be conveyed away to any desired location. As the peanuts drop off the open end of screen panel 134 they fall into a chute opening 201 located in air duct 202. Air is forced through duct 202 in the direction of arrow G by means of blower fan 203. Fan 203 is driven by belt 204 which passes around pulley 205 which in turn is driven by drive means (not shown) located within drive unit 122. As the peanuts drop into chute opening 201 they are immediately carried through the duct 202 by the air stream and may be deposited at any desired location. In FIGURE 10 the duct 202 is shown as entering the harvesting section 122. Air duct 202 is preferably provided with a curved screened portion 207 so that when the stream of air and peanuts reaches this screened portion, the air, residual dirt and small debris will pass out through the screen and the peanuts will in effect drop out of the air stream where they can be collected by any suitable means. As shown in FIGURE 10, the peanuts drop out and are passed back into the harvesting unit. Threshed peanut vines "TV" are deposited to the rear of the brush member.

In operation, the peanut harvesting machine shown in FIGURES 4 through 10 is pulled in the forward direction indicated by arrow A. As the harvesting machine is drawn in the direction indicated by arrow A, the feed conveyer section is made operative and the pickup fingers 20 sweep closely adjacent to the ground in the same manner as described with reference to FIGURE 1. However, since the feed conveyer belt and pickup fingers 20 are not spaced closely enough together to pick up those loose peanuts which have become prematurely detached from their vines and which are resting on the ground, such prematurely detached peanuts will pass rearwardly under the vine feed conveyer section. As the peanut harvesting machine progresses in a forward direction, the brush member 154 is likewise operatively functioning by virtue of the mechanical arrangement recited previously and is rotating in a counterclockwise direction. The lower peripheral sweep of the brush member 154 is either directly on the surface of the ground or so close thereto that any loose peanuts lying upon the ground will be swept in a forward and upward direction under the combined influence of the centrifugal force imparted by the somewhat flexible radial elements of the brush member 154 and the inclined ramp means 152. The loose peanuts lying upon the ground are in effect brushed or propelled in a forward and upward arcuate direction until finally they are propelled backwardly toward screen 130. As is perhaps best shown in FIGURE 5, the peanuts which are propelled more or less backwardly from the area between the inclined ramp means 152 and the brush member 154 strike screen 130 or portions thereof and then drop into the lower screen section 134. It is of course not necessary that the peanuts being propelled backwardly in this fashion strike a screen member since any type of baffling or deflecting means would be suitable. However, a screen member such as 130 is preferable since it allows the operator to observe at all times the various parts of the operating mechanism.

As the peanuts drop onto the screen member 134, the screen member 134 and associated parts are being violently shaken in a side-to-side movement by virtue of the previously described eccentric member 159 and associated parts 153, 155, 151, 143 and 141. Since the screen member 134 is inclined downwardly toward one side of the machine (as is best shown in FIGURE 9) the peanuts deposited on screen 134 will gradually move to the right (in FIGURE 9) and eventually be discharged into chute 201 of air duct 202. The air in duct 202 will carry the peanuts upwardly through the vertical leg of duct 202 (see FIGURE 10) and when the air exits through screened portion 207 the peanuts will be de-entrained and can be passed into the harvesting section 122 or into any other suitable means.

Figures 11, 12:
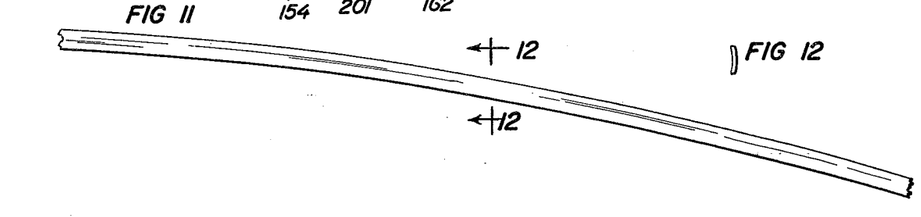
FIGURE 11 is a side elevational view of a brush element.
FIGURE 12 is a cross sectional view of the brush element of FIGURE 11 taken along 12—12.

The selection of the brush members 38 and 154 is believed to be an important factor in the success of this invention. It might ordinarily be expected that all brush members would be exactly equivalent. While any type of brush will give some recovery of peanuts, several types of brushes have been found which will give really superior and essentially complete recovery. One of these superior types of brushes is made from relatively thin strips of oak or hickory or from palmetto stems although similar materials such as bamboo might be equally suitable. By way of example, the general length, width and configuration of a brush element is shown in FIGURE 11 and a cross section thereof is shown in FIGURE 12. Since these elements are made from strips of oak or hickory or from palmetto stems they are generally not of exactly the same length, width or configuration. The outstanding attribute of such brush elements seems to be that they possess both a sufficient stiffness so that it can prevent the passage of a peanut and a sufficient resiliency so that it can, in a crude way, "catapult" peanuts ahead of it.

When the brush members 38 and 154 are between about 24 inches and 36 inches in diameter, and preferably 30 inches in diameter, it has been found that unexpectedly good results are achieved. A 30 inch diameter brush member is preferably rotated at between 75 and 85 r.p.m. The brush elements are preferably not spaced together as closely as the bristles in a household broom and in fact our most satisfactory brush members have been those where in the distance between adjacent bristles at their outer ends varies between ¼ and 1 inch. This is also unexpected since one would ordinarily expect closely packed bristles or brush elements to be more effective. A possible explanation is that by allowing some distance between the outer ends of adjacent bristles, the brush member performs the dual role of a brush and separator or sifter—such spacing permitting loose earth and sand to be bypassed by the individual bristles but not permitting peanuts to be bypassed.

Since the loose peanut pickup means per se may have some novelty in and by itself (i.e., without the vine feed and vine pickup means), applicants are presenting claims thereto. However, it will be understood that the loose peanut pickup means in and by itself will generally be comparatively ineffective, primarily because the threshed peanut vines lying on the ground usually either clog the spaces between the brush elements or they clog the screens and air ducts associated with the brush member.

*Advantages of Novel Harvester*

So far as is known, the novel peanut harvesting machine of this invention is the first which insures a rather complete recovery of both those peanuts which are attached to vines and those peanuts which are prematurely detached from the vines prior to the time that the peanut vines can be harvested. The harvester of this invention is the first harvester which combines pickup means for windrowed vines with attached peanuts and also means for loose peanut pickup in such a manner that the threshed vines from the harvester unit will not interfere with the recovery of the loose peanuts from the ground.

The harvesting machine of this invention is the first to utilize the concept of employing a windrowed vine pickup unit in very close conjunction with a brush-type peanut recovery unit in such a fashion that by virtue of the relative spacing and tandem arrangement of these two units, the two units combine to do a better job of recovering peanuts than can be done if both units operated sequentually but independently of one another. The vine pickup unit, in addition to serving its primary function of picking up peanut vines, serves the further function of clearing vines and other debris away from loose peanuts lying on the ground until the brush pickup unit can both get to them and to operate more efficiently and more effectively upon them. Unless the vine pickup unit is situated in advance of the brush pickup unit and unless the threshed vines are deposited behind the brush pickup unit, the brush pickup unit cannot really function to its fullest capacity.

In conclusion, while there has been illustrated and described some preferred embodiments of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the well known doctrine of reasonable equivalents. Having thus described our invention, what we claim as new and desire to secure a United States Letters Patent for is:

1. A novel peanut harvesting machine characterized by the following features:

a drawbar section adapted to have its forward end operatively attached to a tractor,
   a mainframe section connected to and disposed rearwardly of said drawbar section for supporting the various sections of said peanut harvester,
   at least one wheel attached to said mainframe section which serves to elevate said mainframe section the desired distance above the ground and facilitates movement thereof along the ground,
   a combination vine pickup and vine conveyor arrangement attached to the forward portion of said mainframe and which has a feed surface which is adapted to move vines and attached peanuts in an upward and rearward direction,
   an elongated rotating cylindrical brush member having its axis disposed horizontally above the surface of the ground in a line transverse to the direction of travel,
   said brush member being located rearwardly of the lower front end of said combined vine pickup and vine conveying surface,
   said brush member being located at a level lower than the upper back end of said combined vine pickup and vine conveying surface,
   means for adjusting the lower peripheral sweep of said elongated brush member to any desired distance above the ground,
   means for rotating said brush member about its axis;
   an inclined ramp means transversely disposed closely adjacent to at least a portion of the periphery of said brush member;
   the lower transverse edge of said inclined ramp means being disposed substantialy at ground level;
   the upper transverse edge of said inclined ramp means being disposed closely adjacent to and in substantially parallel relationship with a transverse peanut conveyer means;
   said transverse peanut conveyer means being mounted on said mainframe section, and
   collecting means located adjacent the end of said transverse peanut conveyer means which is adapted for the collection of peanuts deposited upon said transverse conveyer means by the combined action of the brush member and the inclined ramp means.

2. A machine according to claim 1 wherein said inclined ramp means comprises a substantially arcuate section of metal having a radius slightly greater than the radius of said brush member.

3. A machine according to claim 2 wherein said arcuate section has a plurality of spaced openings therein which are insufficiently large to permit a peanut to pass therethrough.

4. A machine according to claim 3 wherein said peanut conveyer means is associated with means for deflecting the peanuts delivered from the brush member into the peanut conveyer means.

5. A machine according to claim 1 wherein said transverse peanut conveyer means has its lower conveying surface inclined downwardly toward one end and is connected to means for vibrating and shaking the conveyer surface so that the peanuts deposited on said lower conveying surface will move toward said downwardly inclined end for discharge therefrom.

6. A machine according to claim 5 wherein said peanut conveyer means is associated with means for deflecting the peanuts delivered from the brush member into the peanut conveyer means.

7. A machine according to claim 3 wherein said arcuate ramp means consists of two arcuate sections in hinged relationship, the lower transverse edge of said lower section being adapted to ride along the ground in contacting relationship.

8. A machine according to claim 6 wherein the chute and air elevating means are located adjacent the lower end of said conveying surface adapted for the reception of peanuts discharged from said conveying surface.

9. A machine according to claim 1 wherein said transverse conveyer means is located to the rear of said brush member.

10. A machine according to claim 1 wherein said inclined ramp means comprises a substantially flat inclined surface, the upper transverse edge of which is disposed on substantially the same level as a transversely moving conveyer means located in front of said brush member.

11. A novel mechanical peanut pickup device characterized by the following features:

a mainframe section for supporting the various sections of said peanut pickup device,
   an elongated rotating cylindrical brush member having its axis disposed horizontally above the surface of the ground in a line transverse to the direction of travel,
   means for adjusting the lower peripheral sweep of said elongated brush member to any desired distance above the ground,
   means for rotating said brush member about its axis,
   an inclined ramp means transversely disposed closely adjacent to at least a portion of the periphery of said brush member,
   the lower transverse edge of said inclined ramp means being disposed substantially at ground level,
   the upper transverse edge of said inclined ramp means being disposed closely adjacent to and in substantially parallel relationship with a transverse peanut conveyer means,
   said transverse peanut conveyer means being mounted on said mainframe section, and
   collecting means located adjacent the end of said transverse peanut conveyer means which is adapted for the collection of peanuts deposited upon said transverse conveyer means by the combined action of the brush member and the inclined ramp means.

12. A machine according to claim 11 wherein said inclined ramp means comprises a substantially arcuate section of metal having a radius slightly greater than the radius of said brush member.

13. A machine according to claim 12 wherein said arcuate section has a plurality of spaced openings therein which are insufficiently large to permit a peanut to pass therethrough.

14. A machine according to claim 13 wherein said peanut conveyer means is associated with means for deflecting the peanuts delivered from the brush member into the peanut conveyer means.

15. A machine according to claim 11 wherein said transverse peanut conveyer means has its lower conveying surface inclined downwardly toward one end and is connected to means for vibrating and shaking the conveyer surface so that the peanuts deposited on said lower conveying surface will move toward said downwardly inclined end for discharge therefrom.

16. A machine according to claim 15 wherein said peanut conveyer means is associated with means for deflecting the peanuts delivered from the brush member into the peanut conveyer means.

17. A machine according to claim 13 wherein said arcuate ramp means consists of two arcuate sections in hinged relationship, the lower transverse edge of said lower section being adapted to ride along the ground in contacting relationship.

18. A machine according to claim 16 wherein the chute and air elevating means are located adjacent the lower end of said conveying surface adapted for the reception of peanuts discharged from said conveying surface.

19. A machine according to claim 11 wherein said transverse conveyer means is located to the rear of said brush member.

20. A machine according to claim 11 wherein said inclined ramp means comprises a substantially flat inclined surface, the upper transverse edge of which is disposed on substantially the same level as a transversely moving conveyer means located in front of said brush member.

References Cited in the file of this patent

UNITED STATES PATENTS

| | | |
|---|---|---|
| 1,727,431 | Herr et al. | Sept. 10, 1929 |
| 1,858,000 | Clausen | May 10, 1932 |